United States Patent [19]

Spirk

[11] 4,277,709

[45] Jul. 7, 1981

[54] LARGE DIAMETER SYNCHRONOUS ELECTRIC MACHINE

[75] Inventor: Franz Spirk, Berlin, Fed. Rep. of Germany

[73] Assignee: Siemens Aktiengesellschaft, Berlin and Munich, Fed. Rep. of Germany

[21] Appl. No.: 55,462

[22] Filed: Jul. 6, 1979

[30] Foreign Application Priority Data

Jul. 12, 1978 [DE] Fed. Rep. of Germany ....... 2831123

[51] Int. Cl.³ .............................................. H02K 1/22
[52] U.S. Cl. ..................................... 310/261; 310/218
[58] Field of Search ............... 310/261, 267, 269, 262, 310/218

[56] References Cited

U.S. PATENT DOCUMENTS

| 1,817,054 | 8/1931 | Baudry | 310/261 |
| 3,112,420 | 11/1963 | Meyer | 310/261 |
| 3,128,403 | 4/1964 | Gynt | 310/261 |
| 4,110,652 | 8/1978 | McGahern | 310/261 |

FOREIGN PATENT DOCUMENTS 410144 10/1966 Switzerland ............................. 310/261

Primary Examiner—Mark O. Budd
Attorney, Agent, or Firm—Kenyon & Kenyon

[57] ABSTRACT

In a synchronous electric machine having a hollow rotor shaft, the dimensions for the seating surfaces of the shrink fit between the lamination ring and the hub are chosen so that lifting of the lamination ring at speeds above the nominal speed of rotation is limited to the portion of the axial length which is located on the side facing away from the turbine, while lifting below the nominal speed is provided in the region adjacent to the end face of the rotor on the turbine side. The rotor shaft is thus load-relieved, the lifting speed being determined so that the allowable material stress is not exceeded in that region.

3 Claims, 3 Drawing Figures

LARGE DIAMETER SYNCHRONOUS ELECTRIC MACHINE

BACKGROUND OF THE INVENTION

1. Field of the Invention

This invention relates to a synchronous electric machine having a rotor in which the field poles are supported by a lamination ring (chain) which is guided tangentially and shrunk onto a hub arranged on the rotor shaft in such a manner that the lamination ring is lifted only at speeds above the nominal speed of revolution.

2. Description of the Prior Art

A synchronous machine of the above type is described in U.S. Pat. No. 3,128,403.

In hydro-electric generators having large diameters, a hollow shaft is frequently used as the rotor shaft and the turbine shaft is coupled to it. The hub of the rotor itself may also be designed as a hollow rotor shaft. In such designs, the hollow rotor shaft is subjected to higher stresses at the point of coupling to the turbine shaft than on the other side of the machine, as the stresses due to centrifugal force, the weight of the rotor, and shrinkage forces of the lamination ring (chain) are added to the existing stresses resulting from the transmission of torque and, possibly, of water thrust and the weight of the turbine. It therefore becomes important to make the design of the rotor such that the allowable stress level in the material of the shaft is not exceeded at this critical point.

SUMMARY OF THE INVENTION

According to the invention, the dimensions for the seating surfaces of the shrink-fitted joint between the lamination ring and the hub, in a synchronous electric machine of the type described above, are chosen, in the case of a hollow rotor shaft, so that the lifting-off of the lamination ring, at speeds above the nominal speed, is limited to a portion of the axial length on the side of the motor facing away from the turbine, while lifting, at below the nominal speed, is provided in the region adjacent to the end face on the turbine side. The shrink fit is therefore different along the axial length of the rotor and is specifically designed so that the forces generated by the shrinkage adjacent to the end face of the rotor on the turbine side are smallest. They are designed so that the allowable material stress is not exceeded at that point. While lifting of the lamination ring takes place in this region at speeds below the nominal speed, no deformation of the lamination ring from circular shape takes place as a result of the one-sided lifting, since the lamination ring continues to be guided on the other side of the machine, as usual, up to speeds above the nominal speed of rotation. The lifting of the lamination chain, however, results in the hub being load-relieved in the highly stressed region.

The necessary radial variation with axial length in the shrink joint between lamination chain and the hub is provided by appropriately tapering (making conical) or subdividing into steps, the seating surfaces in the joint. In the alternative, the desired contour can also be obtained by the use of shrinkage shims.

DETAILED DESCRIPTION OF THE INVENTION

Figure 1:
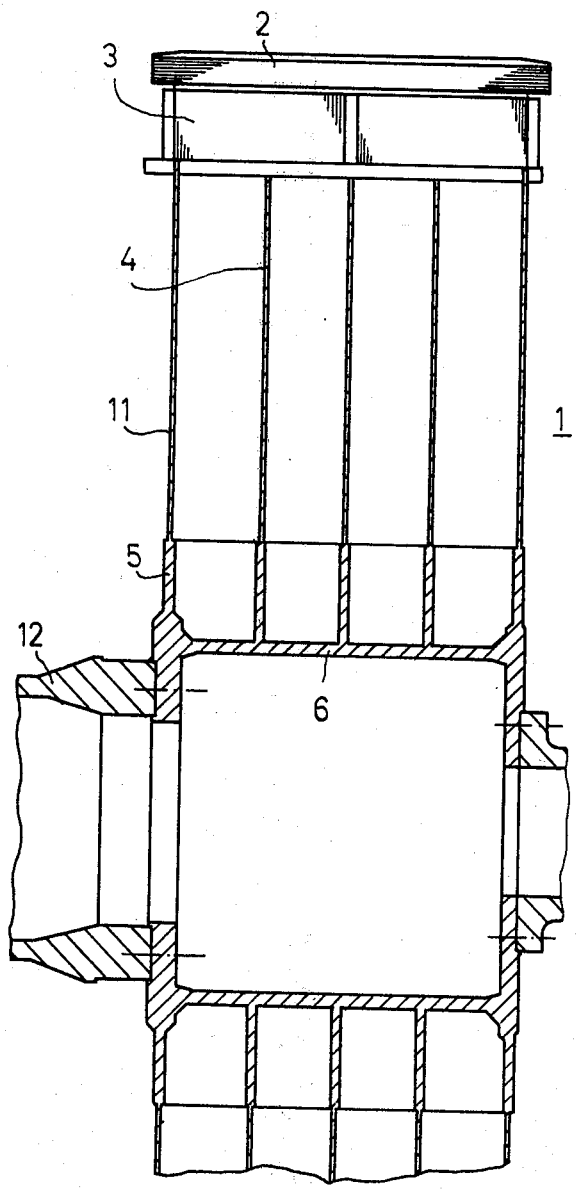
FIG. 1 is a view, in cross-section of a portion of the rotor of a synchronous electric machine, taken along the axis.

Reference in now made to FIG. 1 in which a rotor 1 of a synchronous electric machine, a hydroelectric generator with a large diameter, has field poles 2, which are fastened on a lamination ring 3 which is built up of segments. Lamination ring 3 is, in turn, shrunk onto arms 4 and hub 5, being also restrained tangentially in a manner not shown. The inside wall of hub 5 serves, at the same time, as the hollow rotor shaft 6.

Figure 2:
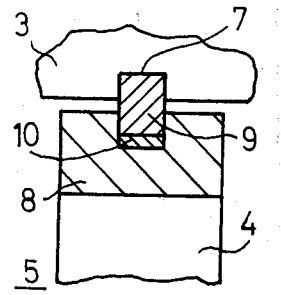

FIG. 2 shows one way in which the seating surface 7 of a shrink-fitted joint between lamination ring 3 and hub 5 is formed by keys 9, which are let into recesses in head beams 8 of the rotor and under which, for easier adjustment of the shrink fit, shims 10 lie. These shrinkage shims are tapered (conical) and have their greatest thickness (height) on the side facing away from the turbine attached to rotor 1. The dimensions of shrinkage shims 10 and of seating surface 7 are chosen so that lifting of lamination ring 3 takes place only at speeds which are 110 to 120% of the nominal speed of rotation and over a substantial portion of the axial length on the side facing away from the turbine. Because of the taper, however, lamination ring 3 is lifted off in the region adjacent to end face 11 on the turbine side at speeds below the nominal speed of rotation, for instance, at 30%, if that is the speed at which the allowable stress of the material of hollow rotor shaft 6 is reached. By the lifting of lamination chain 3, rotor shaft 6 is thus load-relieved in the region where turbine shaft 12 is connected to rotor shaft 6 and where the torque is transmitted; overstressing the material is thus prevented.

Figure 3:
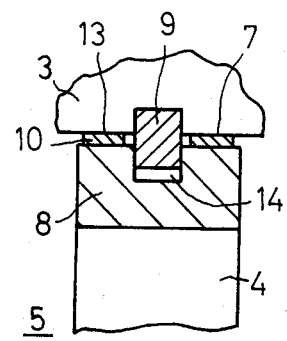
FIGS. 2 and 3 are views in cross-section of the rotor.

In the embodiment example shown in FIG. 3, shims 10 are arranged between the upper surface of head beam 8 and inside surface 13 of lamination ring 3 and therefore themselves form the seating surface 7 for the shrink-fitted joint. Key 9, which is now arranged with clearance in the oppositely facing slot 14 of head beam 8, serves here only to provide tangential guidance for lamination chain 3.

Instead of the tapered (conical) shape of the shims or the seating surface, the latter can also have different diameters at different sections. Shrinkage forces which are equal over the related length of the shims are thus obtained.

What is claimed is:

1. In a synchronous electric machine, especially a large diameter hydroelectric generator, having a rotor which has field poles supported on a ring built up of lamination segments, the ring being guided tangentially and shrink-fitted onto a hub carried on a hollow rotor shaft in such a way that the ring is lifted off only at speeds substantially above the nominal speed of rotation, the improvement comprising:

the dimensions for the seating surfaces of the shrink fit between the ring and the hub being so chosen that lifting of the ring below the nominal speed of rotation is provided in a portion of the axial length of the ring adjacent to the end face of the hub on the turbine side of the rotor and that lifting of the axial portion of the ring on the side of the hub facing away from the turbine can occur only at speeds substantially above the nominal speed.

2. In a synchronous electric machine in accordance with claim 1, the further improvement comprising: shrinkage shims of varied thickness for altering the dimensions of the seating surfaces and adjusting the shrink fit over the axial length of the lamination ring.

3. In a synchronous electric machine in accordance with claim 2, the further improvement comprising: the shims being tapered.

* * * * *